(12) United States Patent
Morita et al.

(10) Patent No.: US 6,259,200 B1
(45) Date of Patent: Jul. 10, 2001

(54) ACTIVE-MATRIX DISPLAY APPARATUS

(75) Inventors: Shintarou Morita; Yuuki Tashiro, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/030,506

(22) Filed: Feb. 25, 1998

(30) Foreign Application Priority Data

Feb. 28, 1997 (JP) .................................................. 9-061969

(51) Int. Cl.[7] .................................................. G02F 1/1333
(52) U.S. Cl. ........................ 313/498; 349/110; 313/505
(58) Field of Search .................................... 313/498, 505; 349/104, 110, 122, 137

(56) References Cited

U.S. PATENT DOCUMENTS

| | | | |
|---|---|---|---|
| 5,459,596 | 10/1995 | Ueda et al. | 359/59 |
| 5,822,026 | 10/1998 | Matsuo | 349/38 |
| 5,847,792 | 12/1998 | Kobayashi et al. | 349/110 |
| 5,953,088 | 9/1999 | Hanazawa et al. | 349/110 |

*Primary Examiner*—Nimeshkumar D. Patel
*Assistant Examiner*—Matthew J. Gerike
(74) *Attorney, Agent, or Firm*—Rader, Fishman & Grauer; Ronald P. Kananen

(57) ABSTRACT

An active-matrix display apparatus includes a pair of transparent top and bottom insulating substrates mutually attached with a predetermined gap left therebetween, and an electro-optical material such as a liquid crystal held in the gap. The bottom insulating substrate has opaque signal lines and gate lines that intersect the signal lines, a bottom-gate type thin-film transistor arranged at each intersection, and a transparent pixel electrode arranged in an aperture surrounded by the signal lines and the gate lines and connected to the corresponding thin-film transistor. The top insulating substrate is provided with an opposing electrode and a shading black mask aligned with at least the gate line. It is noted that the bottom insulating substrate is provided with a light-shielding film. The light-shielding film is arranged beneath the signal line and the pixel electrode, and extends to overlap the edge portions of the pixel electrodes adjacent to the signal line, and is manufactured of the same material as the gate line.

10 Claims, 6 Drawing Sheets

BACK LIGHT

BACK LIGHT

BACK LIGHT

FIG. 7
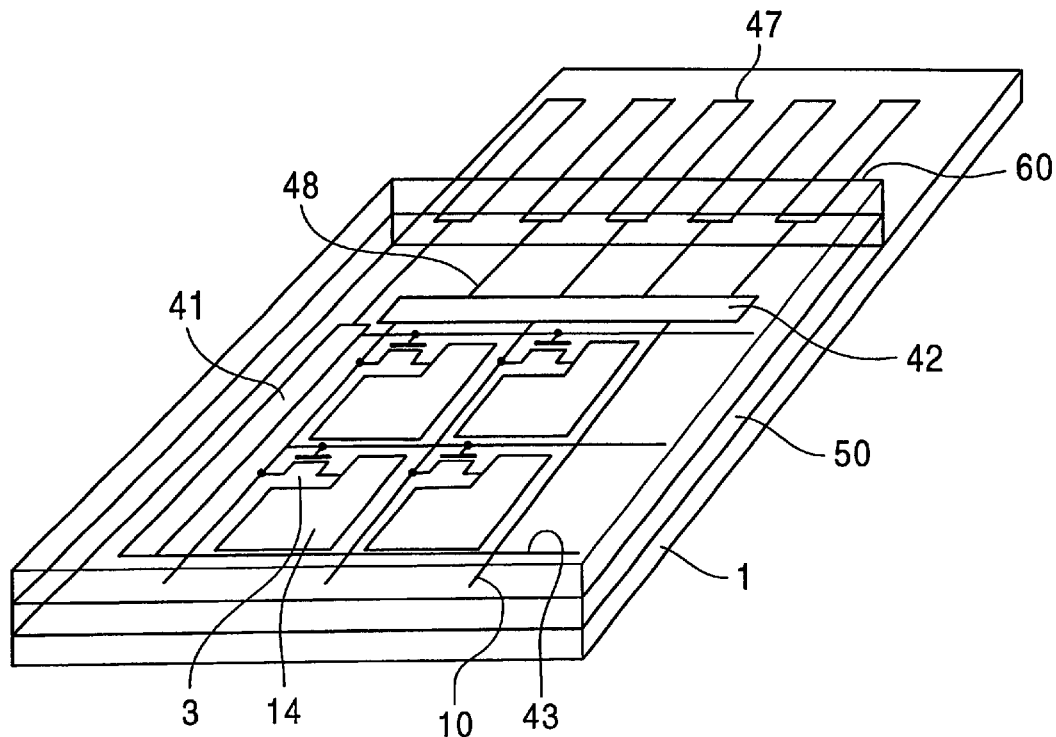
FIG. 8
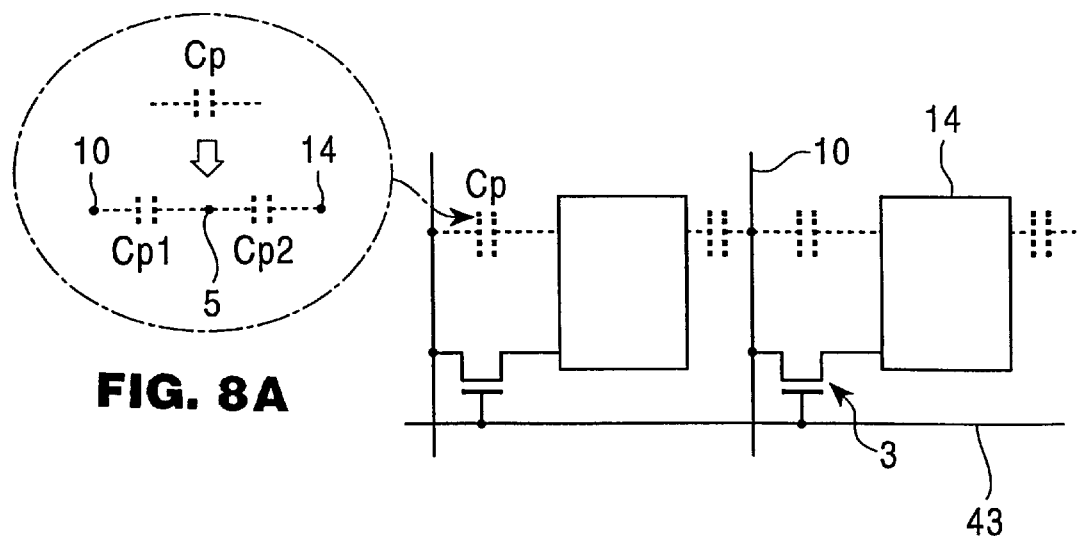
FIG. 8A

BACK LIGHT

ACTIVE-MATRIX DISPLAY APPARATUS

BACKGROUND OF THE INVENTION

1. Field of the Invention

The present invention relates to an active-matrix display apparatus comprising a pair of insulating substrates attached to each other with a predetermined gap kept therebetween and an electro-optical material such as a liquid crystal filling the gap. More particularly, the present invention relates to the light-shielding structure of a signal line that is formed along with a thin-film transistor and its pixel electrode on the one insulating substrate.

2. Description of the Related Art

Referring to FIG. 7, the typical arrangement of an active-matrix display apparatus is briefly discussed. The display apparatus has a flat panel structure in which an electro-optical material such as a liquid crystal 50 is held between a lower insulating substrate 1 and an upper or top insulating substrate 60. A pixel array and drive circuit are integrated on the insulating substrate 1. The drive circuit is divided into a vertical scanning circuit 41 and a horizontal scanning circuit 42. Terminal electrodes 47 for external connections are formed on a top end portion of the insulating substrate 1. Each terminal electrode is connected to the vertical scanning circuit 41 and horizontal scanning circuit 42 via a wiring 48. Gate lines 43 and signal lines 10 intersecting each other are formed on the pixel array. The gate lines 43 are connected to the vertical scanning circuit 41 and the signal lines 10 are connected to the horizontal scanning circuit 42. A pixel electrode 14 and a thin-film transistor 3 for driving it are formed at each intersection where a gate line 43 intersects a signal line 10. Although they are not shown, an opposing electrode and a black mask are formed on the inner surface of the top insulating substrate 60. When a material having a relatively low heat resistance, such as glass, is used for the insulating substrate 1, the thin-film transistor 3 needs to be formed on the insulating substrate 1 through a low-temperature process at 60° C. or lower. Although the thin-film transistor 3 is either of a top-gate type or a bottom-gate type, the bottom-gate type is more suited to the low-temperature process. The bottom-gate type thin-film transistor is constructed by laminating a gate electrode, a gate insulating film and then a semiconductor thin-film from bottom to top.

The pixel electrode 14 is arranged in an aperture surrounded by the signal lines 10 and the gate lines 43, and is connected to the corresponding thin-film transistor 3. To shade the area other than the aperture, a black mask (not shown) is formed on the top insulating substrate (opposing substrate) 60. The black mask is typically patterned in a grid (matrix) that matches the pattern in which the signal lines 10 and the gate lines 43 intersect each other. When the active-matrix display apparatus is assembled, the bottom insulating substrate 1 and the top insulating substrate 60 need to be glued to each other in a mutually aligned position. To offset the error in alignment, the black mask formed on the top insulating substrate 60 permits a margin of extra width of 3 μm or more across the pattern against the dimension of the design requirement. This arrangement sacrifices the aperture ratio of the pixel electrode 14, lowering the brightness of the screen of the apparatus. There is room for improvement in the arrangement of the black mask. In the manufacturing of the bottom-gate type thin-film transistor through the low-temperature process, current technology fails to provide the structure (on-chip black) in which the black mask is formed on the bottom insulating substrate 1, and there is no choice but to form the black mask on the top insulating substrate (opposing substrate) 60. This arrangement imposes a substantial limitation on the design of pixel, for example, on the aperture ratio of pixel.

SUMMARY OF THE INVENTION

Accordingly, it is an object of the present invention to improve the aperture ratio of pixel.

To achieve the above object, the active-matrix display apparatus of the present invention comprises a first transparent insulating substrate supporting thereon signal lines and gate lines which intersect each other, a bottom-gate type thin-film transistor arranged at each intersection, a transparent pixel electrode arranged in an aperture surrounded by the signal lines and gate lines and connected to the corresponding thin-film transistor, and a light-shielding film which is arranged beneath the signal lines and the pixel electrode and which reaches at least the edge portion of the pixel electrode adjacent to the signal line, wherein the light-shielding film is manufactured concurrently with, and of the same material as, the gate line; a second transparent insulating substrate secured to the first transparent insulating substrate with a predetermined gap kept between the first and second transparent insulating substrates, wherein the second transparent insulating substrate is provided with a transparent opposing electrode; and an electro-optical material filling the gap.

Since the light-shielding film is arranged beneath the signal lines and the pixel electrode and extends at least to the end of the pixel electrode next to the signal line, light passing between the signal lines is prevented. Since the light-shielding film is manufactured concurrently with and of the same material as the gate line, no substantial step increase in the manufacturing process results.

The second transparent insulating substrate is preferably provided with at least a shading black mask aligned with the gate line.

Since the opposing substrate (the second transparent insulating substrate) is provided with a striped black mask, light passing around the gate lines and the thin-film transistors is prevented. Unlike conventional black masks, the black mask of the present invention needs to shade the row gate lines only, and is acceptably patterned in stripes rather than in a matrix (grid). Since one-dimensional alignment between the one insulating substrate and the other insulating substrate is acceptable in principle, the alignment operation becomes less severe accordingly. The light-shielding film formed on the thin-film transistor side substrate is also patterned in stripes. The width of the light-shielding film is slightly wider than that of the signal line. The light-shielding film is set to be wide enough to shade the edge of the pixel electrode and the domain where the liquid crystal orientation is disturbed. With this arrangement, the margin in width of the light-shielding film is still narrower than that in the black mask which is formed on the insulating substrate of the opposing electrode in the conventional art. The aperture ratio of pixel electrode is thus set to be greater accordingly. According to the present invention, the matrix-patterned black mask that was formed on the insulating substrate of the opposing electrode in the conventional art is replaced by the light-shielding film formed on the other insulating substrate on which the thin-film transistor is formed. Since the light-shielding film is manufactured of the same material as that of the gate line, the light-shielding film is produced without increasing the number of photomasks in the semiconductor process.

The gate line and the light-shielding film are preferably manufactured of a material selected from the group consisting of chromium, titanium, molybdenum, tungsten, and molybdenum-tantalum.

The signal line is manufactured of a first metal film having a first reflectance, and a second metal film, having a second reflectance lower than the first reflectance, is formed on top of the first metal film.

The signal line is preferably manufactured of a first metal film having a first reflectance, and a second metal film, having a second reflectance lower than the first reflectance, is formed on the second substrate so that the second metal film is aligned with the signal line.

The first metal film is preferably made of aluminum.

The second metal film is preferably made of a material selected from the group consisting of chromium, titanium, molybdenum, tungsten, and molybdenum-tantalum.

The light-shielding film is extended along the border between the signal line and the pixel electrode and is clear from right below the signal line.

A planarization film covering at least the signal line is formed on the first transparent insulating substrate.

The planarization film is preferably manufactured of a transparent organic resin.

According to the present invention, the active-matrix display apparatus having a bottom-gate type thin-film transistor with an active layer of polysilicon formed through low-temperature process,

BRIEF DESCRIPTION OF THE DRAWINGS

FIG. 7 is a perspective view showing diagrammatically a typical construction of an active-matrix display apparatus;

FIGS. 8 and 8A show diagrammatically the stray capacity generated between a pixel electrode and a signal line.

DESCRIPTION OF THE PREFERRED EMBODIMENTS

Figure 1A:
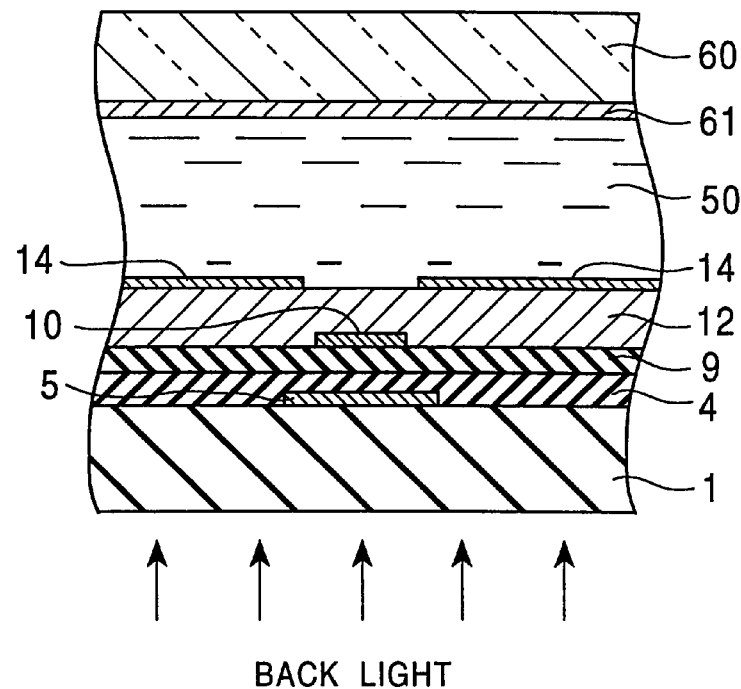
FIGS. 1A and 1B are cross-sectional view and plan views, respectively, diagrammatically showing part of a first embodiment of the active-matrix display apparatus of the present invention.

Referring to the drawings, the embodiments of the present invention are now discussed.

Figure 1B:
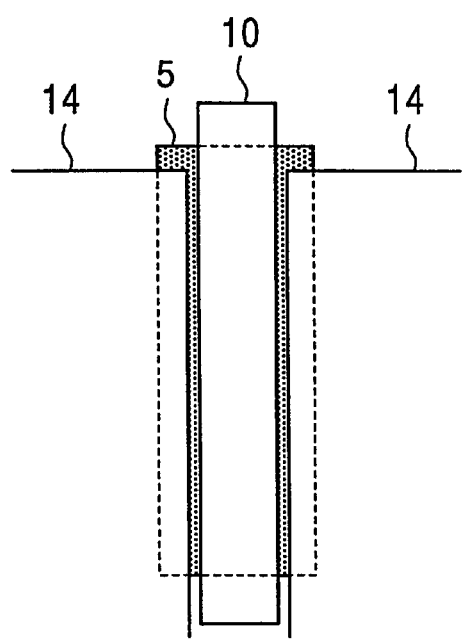

FIGS. 1A and 1B are cross-sectional view and partial plan views, respectively, diagrammatically showing a first embodiment of the active-matrix display apparatus of the present invention. As shown, the active-matrix display apparatus includes a pair of transparent insulating substrates 1 and 60 attached to each other with a predetermined gap kept therebetween, and an electro-optical material such as a liquid crystal 50 filling the gap. The bottom insulating substrate 1 has signal lines 10 (manufactured of Al or Ag, for example) and gate lines (not shown) which intersect each other, a bottom-gate thin-film transistor (not shown) arranged at each intersection, a pixel electrode 14 arranged in an aperture surrounded by the signal lines 10 and gate lines and connected to the corresponding thin-film transistor. A transparent opposing electrode 61 and a shading black mask (not shown) aligned with at least the gate lines are formed on the top insulating substrate (opposing substrate) 60. It is noted that a light-shielding film 5 is formed on the bottom insulating substrate 1. The light-shielding film 5 is positioned beneath the signal lines 10 and the pixel electrodes 14, and is arranged to overlap coextensively the edge portions of the pixel electrodes 14 next to the signal line 10. The light-shielding film 5 is manufactured concurrently with and of the same material as the gate line (not shown).

As shown in FIG. 1A, the light-shielding film 5 is formed on the surface of the bottom insulating substrate 1 made of glass or the like. The light-shielding film 5 is manufactured concurrently with and of the same material (Cr, Ti, Mo, W, Mo—Ta) as the gate line. An extra photomask is not needed to pattern the light-shielding film 5, and modifying the pattern of the photomask for the gate line is sufficient. The light-shielding film 5 is coated with a gate insulating film 4 and an interlayer film 9 made of an inorganic material such as $SiO_2$. The signal lines 10 made of Al is patterned on the interlayer film 9. A planarization film 12 made of a transparent organic resin is applied to cover the signal lines 10. The pixel electrodes 14 of transparent conductive film such as an ITO film are patterned on the planarization film 12. As shown, the light-shielding film 5 is arranged in right alignment beneath the signal line 10 to block a back light introduced from the side of the bottom insulating substrate 1 and thus to prevent stray light toward the top insulating substrate 60.

As shown in FIG. 1B, the light-shielding film 5 is patterned in stripes in alignment with the signal line 10, and the width of the light-shielding film 5 is set such that the light-shielding film 5 overlaps the edge portions of the pixel electrodes 14 next to the signal line 10. It is not preferred that the pixel electrodes 14 in their plan pattern overlap the signal line 10. Overlapping areas of both will generate a stray capacity therebetween. For this reason, a spacing is kept between the signal line 10 and the pixel electrodes 14, and the light-shielding film 5 is required to shade the spacing.

Figure 2:
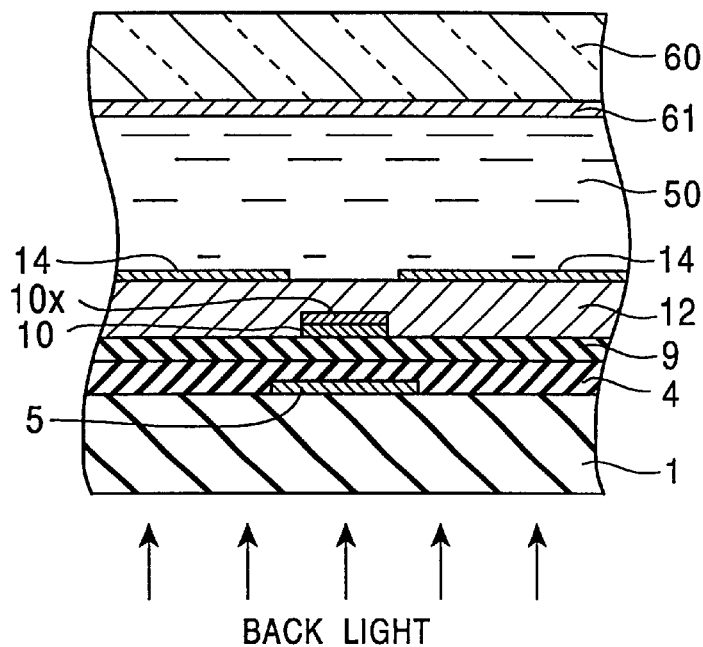
FIG. 2 is a cross-sectional view showing partly a second embodiment of the active-matrix display apparatus of the present invention.

FIG. 2 is a cross-sectional view showing partly a second embodiment of the active-matrix display apparatus of the present invention. Components identical to those described with reference to FIG. 1 in connection with the first embodiment are designated with the same reference numerals. In this embodiment, the signal line 10 is manufactured of a metal film (of Al or Ag, for example) having a relatively high reflectance, and another metal film 10×(of Cr, Mo, Ti, W or Mo—Ta) having a relatively low reflectance is formed on top of the first metal film. According to the present invention, the top insulating substrate 60 is provided with no black mask aligned with the signal lines 10. The top layer of the signal lines 10 of Al will cause its reflectance to be large enough to degrade the quality of image. For this reason, a top layer of a material (Cr, for example) having a relatively low reflectance is further applied on the Al film to preclude unwanted light reflection.

Figure 3:
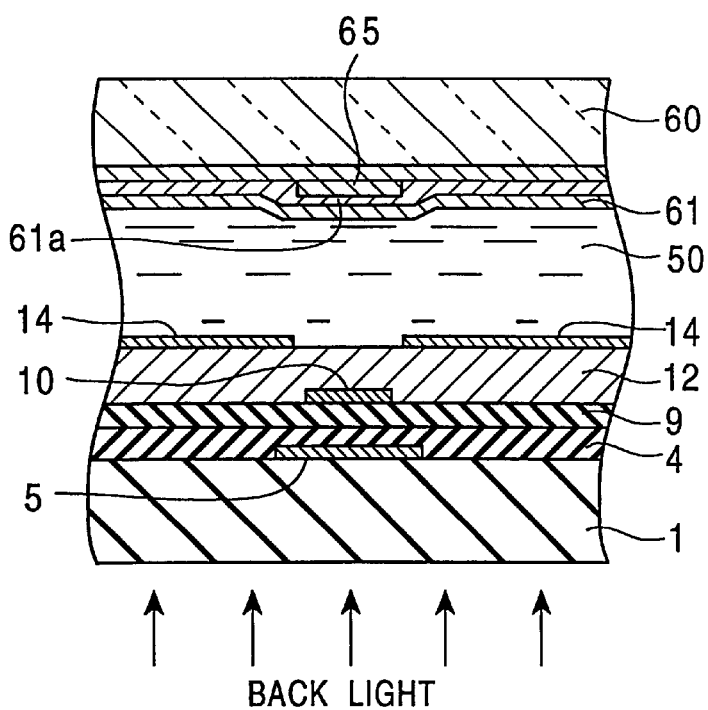
FIG. 3 is a cross-sectional view showing partly a third embodiment of the active-matrix display apparatus of the present invention.

FIG. 3 is a cross-sectional view showing partly a third embodiment of the active-matrix display apparatus of the present invention. Components identical to those described with reference to FIG. 1 in connection with the first embodiment are designated with the same reference numerals. In this embodiment, the signal line 10 is manufactured of a metal film (of Al, for example) having a relatively high reflectance, and another metal film 65 (of Cr, for example) having a relatively low reflectance is formed in alignment with the signal lines 10 to the side of the opposing substrate 60. In this embodiment, the narrow metal film 65 along the signal lines 10 is arranged to the side of the opposing film 60 to prevent surface reflection. The surface reflection prevention metal film 65 may be narrower than the light-shielding film 5 formed on the bottom insulating substrate 1, and is perfectly acceptable if it conceals the signal lines 10. An interlayer film 61a is interposed between the metal film 65 and the opposing electrode 61.

Figure 4:
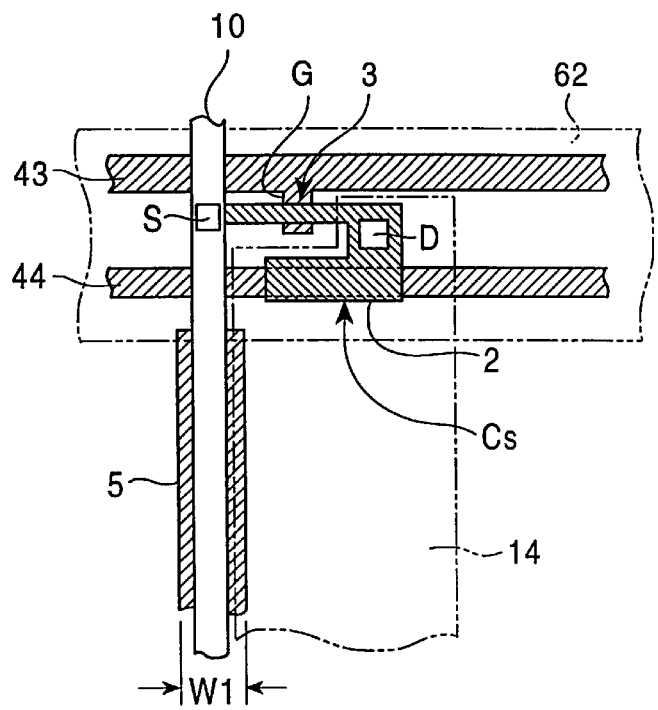
FIG. 4 is a plan view showing partly the design of pattern of the active-matrix display apparatus of the present invention.

FIG. 4 is a plan view showing diagrammatically the design of pattern of the active-matrix display apparatus of the present invention. As shown, the gate lines 43 and auxiliary lines 44 are patterned in rows on the surface of the bottom insulating substrate. A semiconductor film 2 of polysilicon is patterned as an island on the gate insulating film on top of the gate line 43 and auxiliary line 44. The semiconductor film 2, if viewed from above, is partly superimposed on a gate electrode G extended from the gate line 43, to form a bottom-gate type thin-film transistor 3. Furthermore, the semiconductor film 2, if viewed from above, is partly superimposed on the auxiliary line 44, thereby generating an auxiliary capacitance Cs. The signal lines 10 are patterned in rows on the interlayer film on the semiconductor film 2. The gate lines 43 and the signal lines 10 intersect each other in a grid. At each intersection, the thin-film transistor 3 and the auxiliary capacitance Cs are formed. The signal line 10 is electrically connected to the source region of the thin-film transistor 3 through a contact hole S. The pixel electrode 14 is patterned on the planarization film on top of the signal line 10. As shown, the pixel electrode 14 is arranged in an aperture surrounded by the signal lines 10 and the gate lines 43. The pixel electrode 14 is electrically connected to the drain region of the thin-film transistor 3 through a contact hole D. A black mask 62 is patterned in stripes on the opposing substrate. The black mask 62 shields the gate lines 43, auxiliary lines 44 and thin-film transistors 3. It is noted that the light-shielding film 5 is formed in columns on the bottom insulating substrate. The light-shielding film 5 is patterned concurrently with the gate lines 43 and auxiliary lines 44, and is positioned right in alignment beneath the signal lines 10 with the interlayer film and the gate insulating film between itself and the signal lines 10. The light-shielding film 5 has a width dimension of W1 required to cover the gap between the signal lines 10 and the pixel electrode 14. In this way, the black mask 62 arranged in rows on the opposing substrate and the light-shielding film 5 arranged in columns on the insulating substrate intersect each other and surround the pixel electrode 14.

Figure 5:
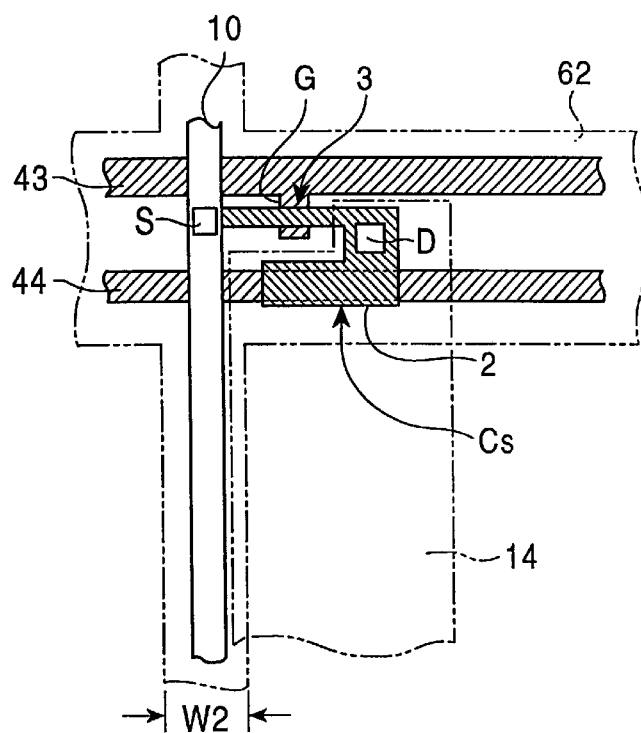
FIG. 5 is a plan view showing partly the design of pattern of the active-matrix display apparatus of the conventional art.

FIG. 5 is a plan view showing partly the design of pattern of a conventional active-matrix display apparatus. Components identical to those described with reference to the pattern shown FIG. 4 are designated with the same reference numerals. As shown, the conventional pattern is without the light-shielding film 5 on the insulating substrate which integrally supports the thin-film transistor, and, instead, is provided with the black mask 62 arranged in a grid (matrix) on the opposing substrate. The row portion of the black mask 62 shields the gate line 43 and auxiliary line 44 while the column portion of the black mask 62 shields the signal line 10 and the edge portions of the pixel electrode 14 adjacent to the signal line 10. The width dimension W2 of the column portion of the black mask 62 needs a margin to offset an alignment error between the top and bottom insulating substrates, and is therefore larger than the width dimension Wi of the light-shielding film 5 shown in FIG. 4. This arrangement sacrifices the aperture ratio of the pixel electrode 14.

According to the present invention, the active-matrix display apparatus having the thin-film transistor integrated employs the light-shielding film 5, which is manufactured concurrently with the gate lines, as a black mask which prevents light passing through between the signal lines 10 and the pixel electrodes 14 and covers the domains where the liquid crystal orientation is disturbed at the edge portions of the pixel electrode 14. The black mask 62 is formed in strips on the opposing substrate to prevent light passing around the gate lines 43, auxiliary lines 44, thin-film transistors 3 and auxiliary capacitance Cs. The light-shielding film 5 has its width W1 wider than that of the signal line 10. The width dimension W1 is wide enough to shade the light passing between pixels and the domains. The width dimension W1 has still a smaller width margin than the width dimension W2 of the black mask that is arranged on the opposing substrate in the conventional art, and a larger pixel aperture ratio results accordingly.

Figure 6:
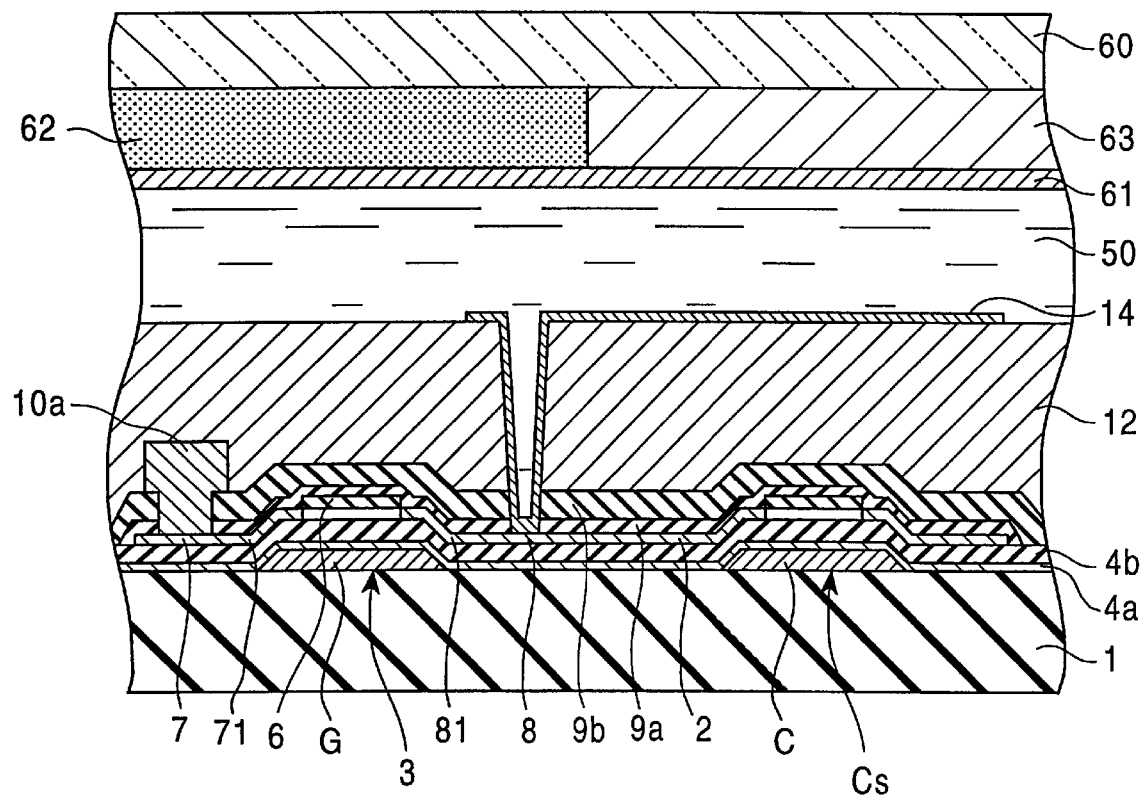
FIG. 6 is a cross-sectional view showing partly the construction of a device in the active-matrix display apparatus of the present invention.

FIG. 6 is a cross-sectional view showing partly the construction of a device in the active-matrix display apparatus of the present invention. As shown, the display apparatus includes a thin-film transistor 3 of a bottom-gate structure, in which the gate electrode G, gate insulating film, and semiconductor film 2 are laminated from bottom on the bottom insulating substrate 1 made of glass, for example. The gate electrode G is extended from the gate line (not shown). The light-shielding film (not shown) characterizing the present invention is formed concurrently with the gate line. The gate electrode G, gate line and light-shielding film are made of a film of Cr as thick as 100 nm. The gate electrode G is coated with a 50 nm thick SiN film 4a using CVD technique, for example. Further on top of it, a 100 nm thick $SiO_2$ film 4b is continuously formed using CVD technique, for example. The gate insulating film is dual-layered with the SiNa film 4a and the $SiO_2$ film 4b. The semiconductor film 2 of polysilicon is formed on top of the gate insulating film. The semiconductor film 2 is produced through a low-temperature process, for example, by converting a non-crystalline silicon film into a polysilicon film through a laser annealing process. A stopper 6 is patterned on the semiconductor film 2 to be in alignment with the gate electrode G. The stopper 6 is made of a 200 nm thick $SiO_2$ film, for example. The area of the semiconductor film 2 immediately beneath the stopper 6 becomes a channel region of the thin-film transistor 3. The semiconductor film 2 has a source region 7 and a drain region 8, both heavily doped with impurities. Also, the semiconductor film 2 has LDD regions 71 and 81, lightly doped with an impurity. The auxiliary capacitance Cs is also formed together with the thin-film transistor 3. As is apparent from FIG. 6, the auxiliary capacitance Cs has the same layer structure as the thin-film transistor 3. One electrode C of the auxiliary capacitance Cs is part of the auxiliary line (not shown), and the other electrode is an extended portion of the semiconductor film 2. Interposed between both electrodes are the SiNa film 4a and the $SiO_2$ film 4b as dielectric materials.

The thin-film transistor 3 and auxiliary capacitance Cs having the above device structure are then coated with a 100-nm thick $SiO_2$ film 9a and a 300-nm thick SiNa film 9b. The $SiO_2$ film 9a and the SiNa film 9b constitute the interlayer film. A wiring electrode 10a is patterned on the interlayer film, and is electrically connected to the source region 7 of the thin-film transistor 3 through the contact hole. The wiring electrode 10a is part of the signal line (not shown). The wiring electrode 10a is coated with the planarization film 12 having a thickness of 1.2 μm at maximum. The pixel electrode 14 made of ITO, for example, is patterned on the planarization film 12. The pixel electrode 14 is electrically connected to the drain region 8 of the thin-film transistor 3 through the contact hole opened through the planarization film 12 and the interlayer film.

The top insulating (opposing) substrate 60 is attached to the bottom insulating substrate 1 having integrally the thin-film transistor 3, auxiliary capacitance Cs and pixel electrode 14 with a predetermined gap kept between both insulating substrates. An electro-optical material such as the liquid crystal 50 is interposed between both insulating substrates 1 and 60. An opposing electrode 61 made of a transparent conductive film such as an ITO film is generally applied to the inner surface of the opposing substrate 60. Also, the opposing substrate 60 has the black mask 62 for shielding the thin-film transistor 3. In addition, a micro-color filter 63 is also arranged correspondingly to the aperture of the pixel electrode 14.

According to the present invention, the light-shielding film manufactured of the same layer as the Cr gate line blocks light passing through between the signal lines and pixel electrodes. By forming the light-shielding film 5 as shown in FIGS. 8 and 8A, a stray capacity Cp is generated among the signal line 10, Cr light-shielding film 5 and ITO pixel electrode 14. Its capacitance not only affects a charge and discharge time for the signal line 10 but also becomes a cause for fluctuating pixel voltage once written, thereby lowering contrast. Although the Cr light-shielding film 5 is floated without being fixed at no potential, there are an overlap between the Al signal line 10 and the Cr light-shielding film 5 and an overlap between the Cr light-shielding film 5 and the ITO pixel electrode 14, and as a result, the stray capacity Cp between the Al signal line 10 and the ITO pixel electrode 14 is increased. This capacitance not only increases the load capacitance of the signal line 10 but also increases the degree of coupling between the signal line 10 and the pixel electrode 14. The increase in the load capacitance of the signal line increases the size of transistors in the horizontal scanning circuit for charging and discharging the signal line, presents difficulty making narrow the frame outline of a panel and increases the load against an external circuit. The increase in the degree of coupling between the signal line and the pixel electrode heightens the possibility of contrast reduction. When the Cr light-shielding film 5 is introduced, the stray capacity Cp is preferably made as small as possible.

The Cr light-shielding film 5, when introduced, is set to be wider in width than the Al signal line 10 in alignment with and above the light-shielding film 5 in the first embodiment shown in FIG. 1. Since the light-shielding film 5 contributes to its shading function only in the vicinity of the edge portions of the Al signal line 10 on both sides, no problems will arise if a slot is formed in the center portion of the light-shielding film 5 as shown in FIG. 9B where the light-shielding film 5 overlaps the signal line 10. With this arrangement, the overlapping area between the Al signal line 10 and the Cr light-shielding film 5 is made as small as possible, and the capacitance Cp1 (FIG. 8A) between the signal line 10 and the Cr light-shielding film 5 is minimized.

Figure 9A:
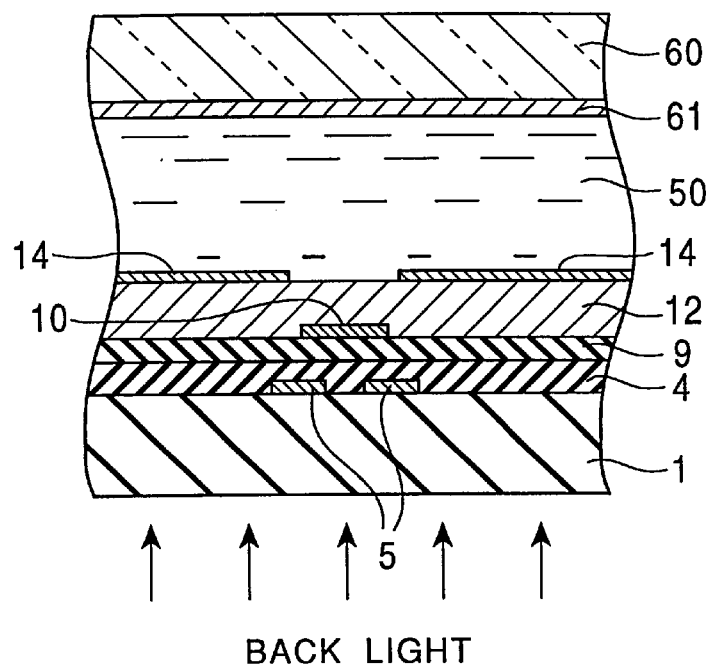
FIGS. 9A and 9B are cross-sectional view and partial plan view, respectively, diagrammatically showing part of a fourth embodiment of the active-matrix display apparatus of the present invention.
Figure 9B:
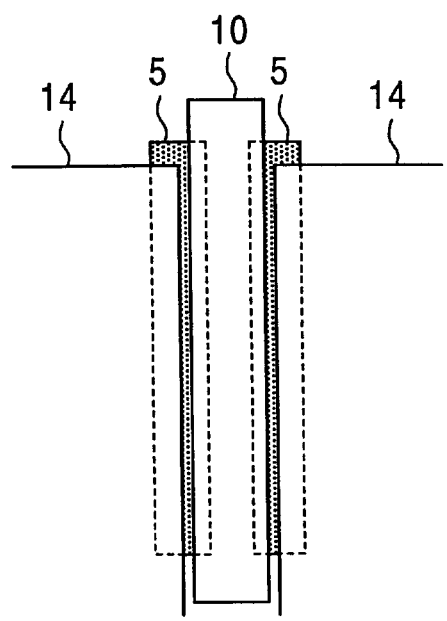

In the fourth embodiment shown in FIGS. 9A and 9B, the black mask, as a light-shielding film for the pixel, produced on the-opposing substrate through the low-temperature process is used to cover the thin-film transistor and the gate line 43, and the Cr light-shielding film 5 on the insulating substrate is used to prevent light passing around the signal line. To reduce the stray capacity Cp generated among the signal line, Cr light-shielding film and ITO pixel electrode, the Cr light-shielding film 5 is split thereby reducing the overlapping area between the Al signal line and the Cr light-shielding film. As a result, the stray capacity Cp between the pixel electrode 14 and the signal line 10 is minimized. The capacitance of the signal line and the degree of coupling between the signal line and the pixel electrode are thus reduced.

According to the present invention, as described above, the active-matrix display apparatus employs the light-shielding film on one insulating substrate having integrally the thin-film transistor and pixel electrode. The light-shielding film is arranged beneath the signal line and pixel electrode, and extends to overlap the edge portions of the pixel electrode adjacent to the signal line, and is manufactured of the same material as the gate line. The use of the light-shielding film allows the shading area along the signal line to be reduced compared with the conventional art, thereby leading to an improved aperture ratio of pixel. The metal film having a low reflectance is formed on the signal line to block the surface reflection of the signal line or a metal film having a relatively low reflectance is formed in alignment with the signal line on the opposing substrate so that unwanted surface reflection is controlled with the quality of image improved. By removing the unnecessary portion of the light-shielding film right beneath the signal line, the stray capacity is reduced.

What is claimed is:

1. An active-matrix display apparatus comprising:
   a first transparent insulating substrate having signal lines and gate lines which intersect each other, bottom-gate type thin-film transistors arranged at each intersection, pixel electrodes arranged in each of an aperture surrounded by the signal lines and gate lines and connected to the corresponding thin-film transistor, and a light-shielding film which is arranged beneath the signal lines and the pixel electrode and which reaches at least the edge portion of the pixel electrode adjacent to the signal line, wherein the light-shielding film is formed concurrently with, and of the same material as, the gate line;
   a second transparent insulating substrate secured to the first transparent insulating substrate with a predetermined gap kept between the first and second transparent insulating substrates, wherein the second transparent insulating substrate is provided with a transparent opposing electrode; and
   an electro-optical material held in the gap.

2. An active-matrix display apparatus according to claim 1, wherein the second transparent insulating substrate is provided with at least a light-shielding black mask aligned with the gate line.

3. An active-matrix display apparatus according to claim 1, wherein the gate line and the light-shielding film are manufactured of a material selected from the group consisting of chromium, titanium, molybdenum, tungsten, and molybdenum-tantalum.

4. An active-matrix display apparatus according to claim 1, wherein the signal line is formed of a first metal film having a first reflectance, and wherein a second metal film, having a second reflectance lower than the first reflectance, is formed on top of the first metal film.

5. An active-matrix display apparatus according to claim 1, wherein the signal line is manufactured of a first metal film having a first reflectance, and wherein a second metal film, having a second reflectance lower than the first reflectance, is formed on the second substrate so that the second metal film is aligned with the signal line.

6. An active-matrix display apparatus according to claim 3, wherein the first metal film is made of aluminum.

7. An active-matrix display apparatus according to claim 6, wherein the second metal film is made of a material selected from the group consisting of chromium, titanium, molybdenum, tungsten, and molybdenum-tantalum.

8. An active-matrix display apparatus according to claim 1, wherein the light-shielding film is extended along the border between the signal line and the pixel electrode and is clear from immediately below the signal line.

9. An active-matrix display apparatus according to claim 1, wherein a planarization film covering at least the signal line is formed on the first transparent insulating substrate.

10. An active-matrix display apparatus according to claim 9, wherein the planarization film is made of a transparent organic resin.

* * * * *